(12) United States Patent
Kasai et al.

(10) Patent No.: US 8,155,037 B2
(45) Date of Patent: Apr. 10, 2012

(54) TRANSMITTER-RECEIVER

(75) Inventors: Masahiro Kasai, Kawasaki (JP);
Takashi Yokoyama, Kawasaki (JP);
Shigeru Okawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 12/275,356

(22) Filed: Nov. 21, 2008

(65) Prior Publication Data
US 2009/0161586 A1     Jun. 25, 2009

(30) Foreign Application Priority Data
Dec. 19, 2007     (JP) .................................. 2007-327798

(51) Int. Cl.
*H04B 7/14* (2006.01)
(52) U.S. Cl. ........................................................ 370/310
(58) Field of Classification Search .................. None
See application file for complete search history.

(56) References Cited

U.S. PATENT DOCUMENTS

| | | | |
|---|---|---|---|
| 6,294,956 B1 * | 9/2001 | Ghanadan et al. | 330/124 R |
| 7,570,718 B2 | 8/2009 | Tashiro | |
| 2004/0038661 A1 * | 2/2004 | Luy et al. | 455/282 |
| 2004/0242166 A1 | 12/2004 | Ikuma | |
| 2005/0255812 A1 * | 11/2005 | Na et al. | 455/78 |
| 2006/0140310 A1 | 6/2006 | Tashiro | |

FOREIGN PATENT DOCUMENTS

| | | |
|---|---|---|
| CN | 1783859 | 6/2006 |
| JP | 5-252074 | 9/1993 |
| JP | 2004-153653 | 5/2004 |

OTHER PUBLICATIONS

Chinese First Office Action dated Sep. 29, 2011, from corresponding Chinese Application No. 200810187130.5.

* cited by examiner

*Primary Examiner* — Kevin C Harper
(74) *Attorney, Agent, or Firm* — Katten Muchin Rosenman LLP

(57) ABSTRACT

There is provided a transmitter receiver apparatus in which a directional coupler and single pole double throw (SPDT) switches are includes on the reception side. In the directional coupler, a reception signal is inputted and split into two signals having phases different from each other by 90° and the two split signals are outputted to SPDTs. Each of the SPDTs outputs each of the split signals to an output terminal connected to an amplifier during a passage mode and to a terminal terminated with a predetermined impedance during a blocking mode.

10 Claims, 11 Drawing Sheets

| CASE No. | OUTPUT VOLTAGES OF THE RF DETECTION CIRCUIT | | OUTPUT VOLTAGE OF THE RECEPTION LEVEL THRESHOLD VALUE DETERMINING UNIT | CHANGEOVER OF RECEPTION LNA |
|---|---|---|---|---|
| | THE FIRST VOLTAGE | THE SECOND VOLTAGE | | |
| 1 | NO RECEPTION | ≤X | Lo | THE FIRST LNA |
| 2 | NO RECEPTION | >X | Hi | THE SECOND LNA |
| 3 | ≤X | NO RECEPTION | Lo | THE FIRST LNA |
| 4 | >X | NO RECEPTION | Hi | THE SECOND LNA |

Fig. 10

TRANSMITTER-RECEIVER

BACKGROUND

1. Field

The present invention relates to a transmitter receiver apparatus of a time division duplex (TDD) system, which performs transmission and reception in a time division manner.

2. Description of the Related Art

As a transmitter-receiver in the TDD system, there has hitherto been known one having a construction wherein a switch circuit that is in an ON state for a period of a reception slot is provided in a pre-stage of a reception circuit, and a circulator is connected between a transmission/reception antenna, and a transmission power amplifier and a switch circuit. In a technique described in Japanese Laid-Open Patent Publication 05-252074, for a period of a transmission slot, a transmission signal is supplied to the transmission/reception antenna from the power amplifier through the circulator. For the period of the reception slot, a reception signal received by the transmission/reception antenna is supplied to the reception circuit through the circulator and the switch circuit.

However, when performing radio communications using a microwave band or a millimeter wave band, the transmitter-receiver disclosed in the above-described patent document involves the following problems. First, during the transmission period, the switch circuit in the pre-stage of the reception circuit enters an OFF state, and the impedance in the switch circuit during this OFF state has not been taken into consideration, and hence, during the transmission, the impedance as viewed from the transmission side does not become a predetermined load (50Ω). As a result, reflection occurs in the switch circuit during the transmission, thereby raising a problem that the power amplifier on the transmission side, i.e., transmission amplifier cannot be operated in a satisfactory state.

Secondly, in the recent years, with an increasing trend of transmission power, transmission power sneaking into the reception side is on an upward trend. Accordingly, the switch circuit in the pre-stage of the reception circuit is required to have a high ability to block sneaking of the transmission power. It is therefore necessary to constitute the switch circuit by a large size element, resulting in an occurrence of a cost increase problem.

SUMMARY

It is an object of the present invention to provide a transmitter receiver apparatus capable of operating the transmission amplifier in a satisfactory state. It is another object of the present invention to provide a transmitter receiver apparatus allowing a cost reduction.

The present transmitter-receiver is one that performs transmission and reception in a time division manner, and have a directional coupler and single pole double throw (hereinafter, referred to as SPDT) switches provided on the reception side. In the directional coupler, a reception signal is inputted to the first port; the input signal to the first port is split into two signals having phases different from each other by 90° and the two split signals are outputted from the second port and third port; and the fourth port is terminated in a predetermined impedance.

In a first SPDT switch, an output signal from the second port of the directional coupler enters a first input terminal. During a passage mode, the input signal to the first input terminal is outputted from a first output terminal, while during a blockage mode, the first input terminal is connected to a second output terminal. In a second SPDT switch, an output signal from the third port of the directional coupler enters a second input terminal. During the passage mode, the input signal to the second input terminal is outputted from a third output terminal, while during the blockage mode, the second input terminal is connected to a fourth output terminal.

According to this transmitter-receiver, by providing the directional coupler terminated in a predetermined impedance and balance type switches on the reception side, reflecting waves are canceled in the directional coupler during transmission, so that the load as viewed from the transmission side can always be shown as a predetermined impedance. Furthermore, by the reception signal being split into two signals, the ability required of the SPDT switches, to block the sneaking of the transmission power is allowed to be low, which enables the switches to be constituted by compact elements.

BRIEF DESCRIPTION OF THE DRAWINGS

FIG. 10 illustrates a table for explanation the reception level threshold value determining unit used in the transmitter and receiver of the fifth embodiment illustrated in FIG. 8;

DESCRIPTION OF THE PREFERRED EMBODIMENTS

Hereinafter, preferred embodiments of this transmitter-receiver will be described in detail with reference to the appended drawings. Herein, descriptions are made of a transmitter receiver apparatus in the DDT system in a mobile radio communication device that transmits/receives electromagnetic waves in a microwave band or a millimeter wave band. In the descriptions hereinafter, the same or equivalent components are designated by the same symbols.

Outline

Figure 1:
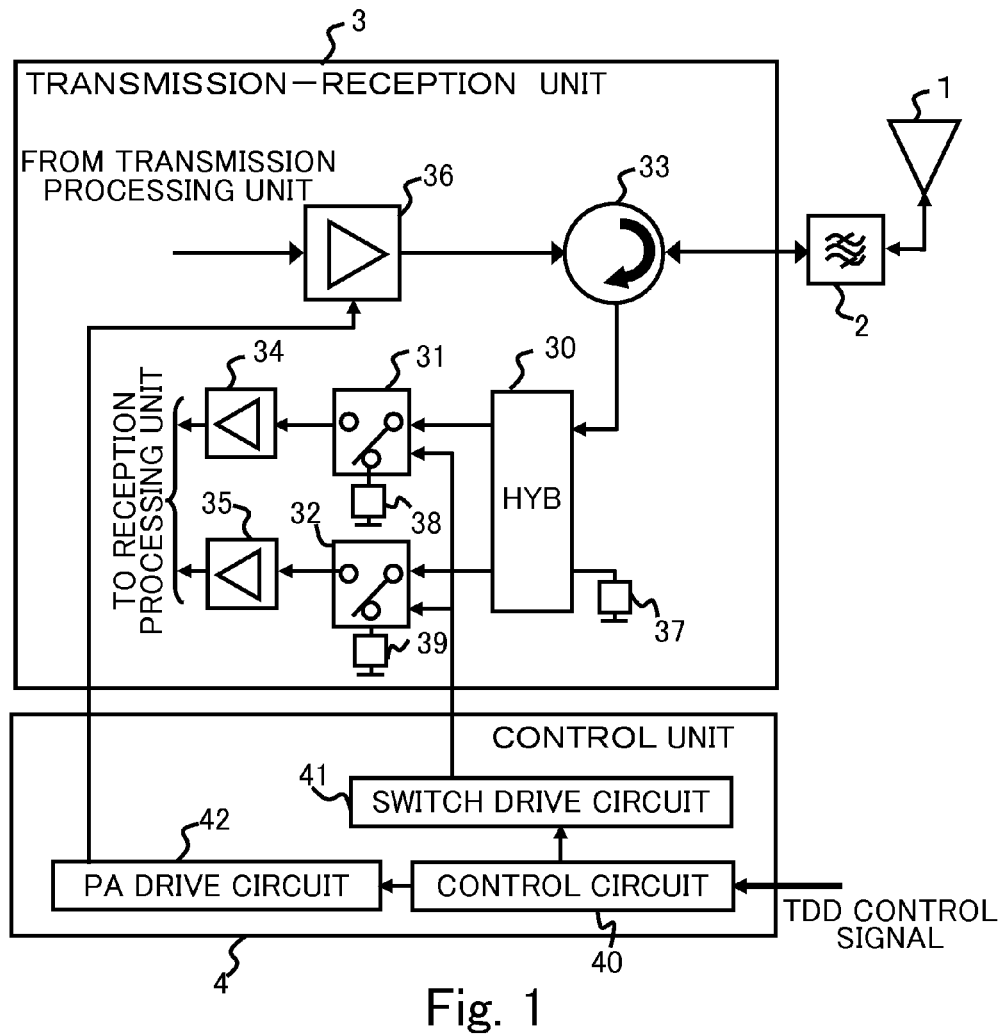
FIG. 1 illustrates a schematic block diagram of a transmitter and receiver according to the first embodiment.

FIG. 1 is a block diagram showing an example of construction of a transmitter receiver apparatus. As shown in FIG. 1, this transmitter-receiver shares the same antenna between the transmission and the reception. In addition, the transmitter-receiver may share a band pass filter 2 between the transmission and the reception. In a transmission-reception unit 3, the reception side has a balance type switch configuration including a first directional coupler 30, a first SPDT switch 31 serving as a first switch, and a second SPDT switch 32 serving as a second switch.

The first directional coupler 30 splits an input signal into two signals having phases different from each other by 90° and outputs them. The first SPDT switch 31 allows one of the output signals to pass during reception, and blocks it during transmission. The second SPDT switch 32 allows the other of the output signals to pass during reception, and blocks it during transmission.

First Embodiment

As shown in FIG. 1, in the transmission-reception unit 3, the transmitter-receiver includes the first directional coupler 30, the first SPDT switch 31, the second SPDT switch 32, a circulator 33 having a function as a transmission/reception switching circuit, a first low noise amplifier 34 having a function as a first reception amplifier, a second low noise amplifier 35 having a function as a second reception amplifier, an large power amplifier 36 having a function as a transmission amplifier. The circulator 33 includes a port for antenna, a port for reception, and a port for transmission.

The port for antenna is connected to the antenna 1, or connected to the band pass filter 2 when the band pass filter 2 is provided between the transmission-reception unit 3 and the antenna 1. The port for reception is connected to the first port of the first directional coupler 30. The port for transmission is connected to an output terminal of the large power amplifier 36. An input terminal of the large power amplifier 36 is connected to a transmission processing unit (not shown).

In the circulator 33, an input signal to the port for transmission is outputted to the port for antenna, but is not outputted to the port for reception. An input signal to the port for antenna is outputted to the port for reception, but is not outputted to the port for transmission. An input signal to the port for reception is outputted to the port for transmission, but is not outputted to the port for antenna.

The first directional coupler 30 is constituted by a 90° hybrid coupler (HYB), and is operable to split a signal that has been inputted to the first port into two signals having phases different from each other by 90°, output one of the split signals from the second port, and output the other of the split signals from the third port. The first port is connected to the port for reception of the circulator 33. The second port is connected to a first input terminal of the first SPDT switch 31. The third port is connected to a second input terminal of the second SPDT switch 32. The fourth port is connected to a terminator 37 of e.g., 50Ω.

In the first SPDT switch 31, a first output terminal thereof is connected to an input terminal of the first low noise amplifier 34, and a second output terminal thereof is connected to a terminator 38 of e.g., 50Ω. In the second SPDT switch 32, a third output terminal thereof is connected to an input terminal of the second low noise amplifier 35, and a fourth output terminal thereof is connected to a terminator 39 of e.g., 50Ω. An output terminal of the first low noise amplifier 34 and an output terminal of the second low noise amplifier 35 are connected to the reception processing unit (not shown).

Figure 2:
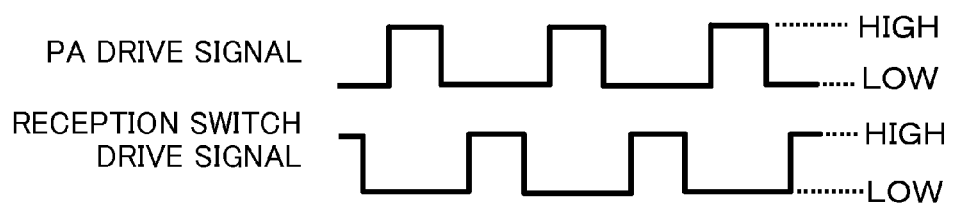
FIG. 2 illustrates an example of a timing chart of operation of the transmitter and receiver illustrated in FIG. 1.

In a control unit 4, the transmitter-receiver includes a control circuit 40, a switch drive circuit 41, and a PA drive circuit 42. On the basis of a TDD control signal, the control circuit 40 outputs a reception switch drive signal and a PA drive signal, respectively, to the switch drive circuit 41 and the PA drive circuit 42. For example, as shown in a timing chart in FIG. 2, the reception switch drive signal is at a Lo level when the PA drive signal is at a Hi level, while the reception switch drive signal is at a Hi level when the PA drive signal is at a Lo level.

Here, it is recommendable that, on the basis of a single TDD control signal, the control circuit 40 creates the reception switch drive signal and the PA drive signal. By doing so, it can be avoided that both of the reception switch drive signal and the PA drive signal become Hi levels due to failure or the like. That is, it is possible to prevent the first low noise amplifiers 34 and the second low-noise amplifier 35 on the reception side from being destroyed by the transmission power sneaking into the reception side.

When the reception switch drive signal inputted from the control circuit 40 is at a Hi level, the switch drive circuit 41 converts a voltage corresponding to the Hi level of the reception switch drive signal into a voltage for operating the switch. When the reception switch drive signal is at a Hi level, the first SPDT switch 31 and the second SPDT switch 32, respectively, are switched to the first output terminal side and the third output terminal side. On the other hand, when the reception switch drive signal is at a Lo level, the first SPDT switch 31 and the second SPDT switch 32, respectively, are switched to the second output terminal side and the fourth output terminal side.

For example, when the first SPDT switch 31 and the second SPDT switch 32 are each an SPDT switch constituted by shunt PIN diodes, the switch drive circuit 41 converts the reception switch drive signal at TTL level to a bias voltage to be applied to the PIN diode.

For example, when the SPDT switch is switched to the terminator side, i.e., during the blockage mode, an reverse bias voltage lower than 0 volt is applied to the PIN diode connected to the terminator side, and a forward bias voltage higher than a forward voltage is applied to the PIN diode connected to the low noise amplifier side. On the other hand, when the SPDT switch is switched to the low noise amplifier side, i.e., during the passage mode, the reverse operation to the foregoing is performed.

There are cases where the first SPDT switch 31 and the second SPDT switch 32 are each constituted by a field-effect transistor (FET). In such cases, the switch drive circuit 41 converts the reception switch drive signal at TTL level to a control voltage to be applied to a gate terminal of the FET.

For example, in the case of a construction in which the FET is connected in parallel with a transmission line, when the SPDT switch is switched to the terminator side, i.e., during the blockage mode, a control voltage lower than a pinch-off voltage is applied to a gate terminal of the FET connected to the terminator side, and a control voltage of 0 V is applied to a gate terminal of the FET connected the low noise amplifier side. On the other hand, when the SPDT switch is switched to the low noise amplifier side, i.e., during the passage mode, the reverse operation to the foregoing is performed. In the case of a construction in which the FET is connected in series with the transmission line, the operation to be performed is the reverse to that performed in the case of a construction in which the FET is connected in parallel.

When the PA drive signal inputted from the control circuit 40 is at a Hi level, the PA drive circuit 42 converts the level of the PA drive signal into a voltage for operating the large power amplifier 36. If the PA drive signal is at a Hi level, the power source of the large power amplifier 36 is in an ON state, while if the PA drive signal is at a Lo level, the power source of the large power amplifier 36 is in an OFF state. For example, when the large power amplifier 36 is constituted by an FET, the PA drive circuit converts the PA drive signal at TTL level into a control voltage to be applied to a gate terminal of the FET. When the FET of the large power amplifier 36 is to be turned on, a voltage higher than a threshold voltage is applied to the gate terminal of the FET, while, when the FET is to be turned off, a voltage lower than the threshold voltage is applied to the gate terminal thereof.

Operations of the transmitter-receiver are as follows. During a transmission period, the power source of the large power amplifier 36 is turned on by the PA drive signal, and a signal that has been inputted to the large power amplifier 36 by the transmission processing unit (not shown) is amplified. The signal outputted from the large power amplifier 36 passes through the circulator 33, passes through the band pass filter 2, and is radiated into the air from the antenna 1. At that time, when the first SPDT switch 31 and the second SPDT switch 32 have the same impedance (for example, each of them is 50Ω or is in an opened state), reflecting waves are cancelled in the first directional coupler 30, so that the load as viewed from the transmission side is always 50Ω.

Furthermore, during the transmission period, the first SPDT switch 31 and the second SPDT switch 32, respectively, have been switched to the sides of the terminators 38 and 39. This makes it possible to block the sneaking of the transmission power into the first low-noise amplifier 34 and the second low-noise amplifier 35, thereby allowing the first low-noise amplifier 34 and the second low-noise amplifier 35 to be prevented from being destroyed.

The transmission power sneaking into the reception side is split by the first directional coupler 30, and enters the first SPDT switch 31 and the second SPDT switch 32. Therefore, as compared with the case where the transmission power sneaking into the reception side is blocked by a single switch, power resistances of the first SPDT switch 31 and the second SPDT switch 32 are allowed to be low. In other words, each of the first SPDT switch 31 and the second SPDT switch 32 can be constituted by a compact element.

30 For example, when the first directional coupler 30 splits the transmission power sneaking into the reception side into halves, the power resistance of each of the first SPDT switch 31 and the second SPDT switch 32 may be one half the power resistance in the case where the transmission power sneaking into the reception side is blocked by a single switch. In this case, each of the first SPDT switch 31 and the second SPDT switch 32 can be constituted by a compact element which has 3 dB smaller in maximum allowable power than a element used in a single switch for blocking the transmission power sneaked into reception side, thereby the each of the first and second SPDT switch 31 and 32 can increase their dimensions.

During a reception period, by the reception switch drive signal, the first SPDT switch 31 and the second SPDT switch 32, respectively, have been switched to the sides of the first low-noise amplifier 34 and the second low-noise amplifier 35. The reception signal passes from the antenna 1 through the band pass filter 2 and the circulator 33, and enters the first port of the first directional coupler 30. Then, in the first directional coupler 30, the reception signal is split into two signals with phases different from each other by 90°.

Out of the signals split by the first directional coupler 30, one is outputted from the second port, and the other is outputted from the third port. The signals outputted from the second port and third port, respectively, pass through the first SPDT switch 31 and the second SPDT switch 32, enter the first low-noise amplifier 34 and the second low-noise amplifier 35, and after having been amplified there, they are sent to the reception processing unit (not shown). During the reception period, the power source of the large power amplifier 36 is in an OFF state.

Second Embodiment

Figure 3:
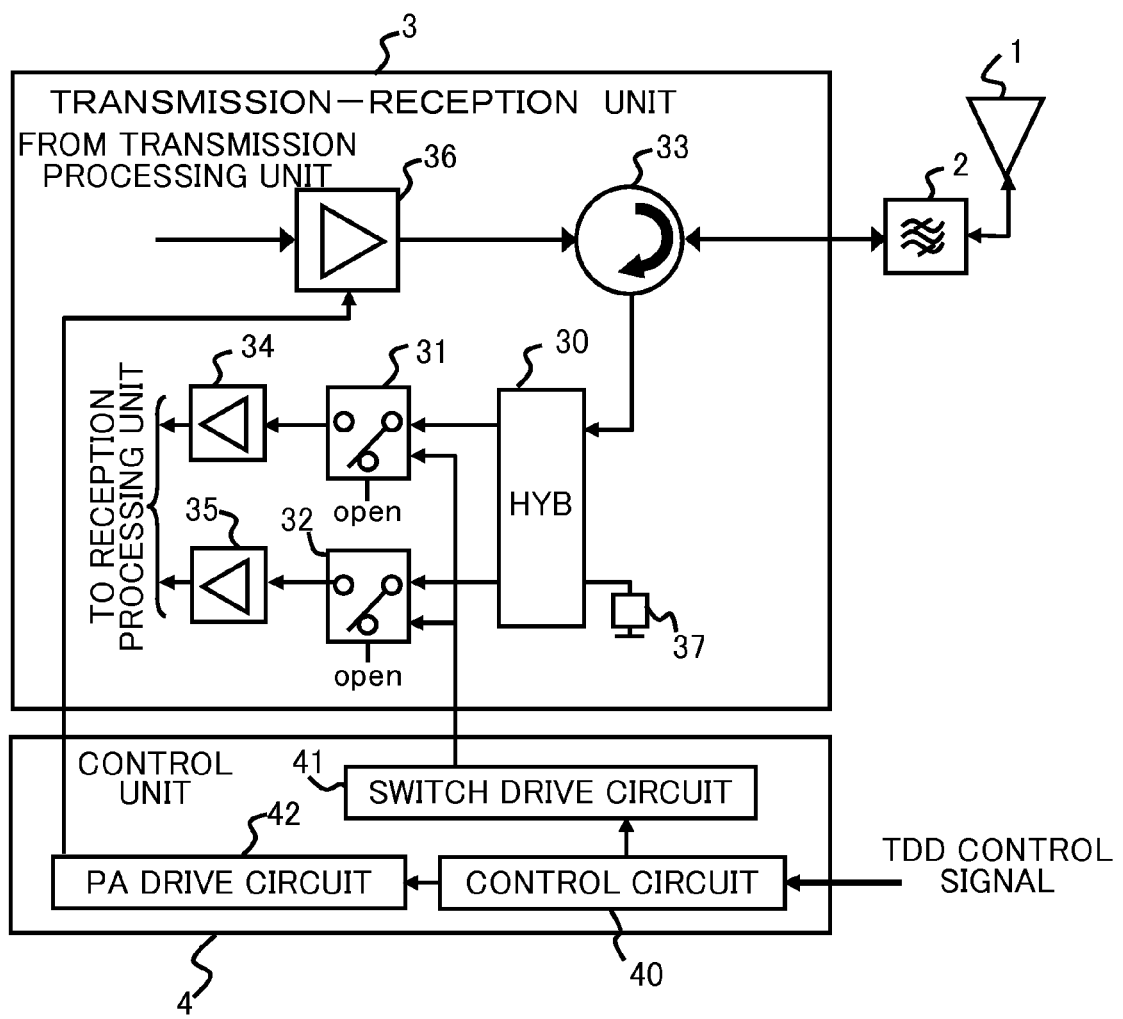
FIG. 3 illustrates a schematic block diagram of a transmitter and receiver according to the second embodiment.

FIG. 3 is a block diagram showing a construction of a transmitter receiver apparatus according to a second embodiment. As shown in FIG. 3, in the transmitter-receiver, the second output terminal of the first SPDT switch 31 is in an opened state, and the fourth output terminal of the second SPDT switch 32 is in an opened state. The rests of the construction and the operations is the same as those of the first embodiment. In this way, even though the second output terminal of the first SPDT switch 31, and the fourth output terminal of the second SPDT switch 32 are not connected to the terminator of 50Ω, reflecting waves from the first SPDT switch 31 or the second SPDT switch 32 are cancelled in the first directional coupler 30 during transmission, the load as viewed from the transmission side is always 50Ω.

Third Embodiment

Figure 4:
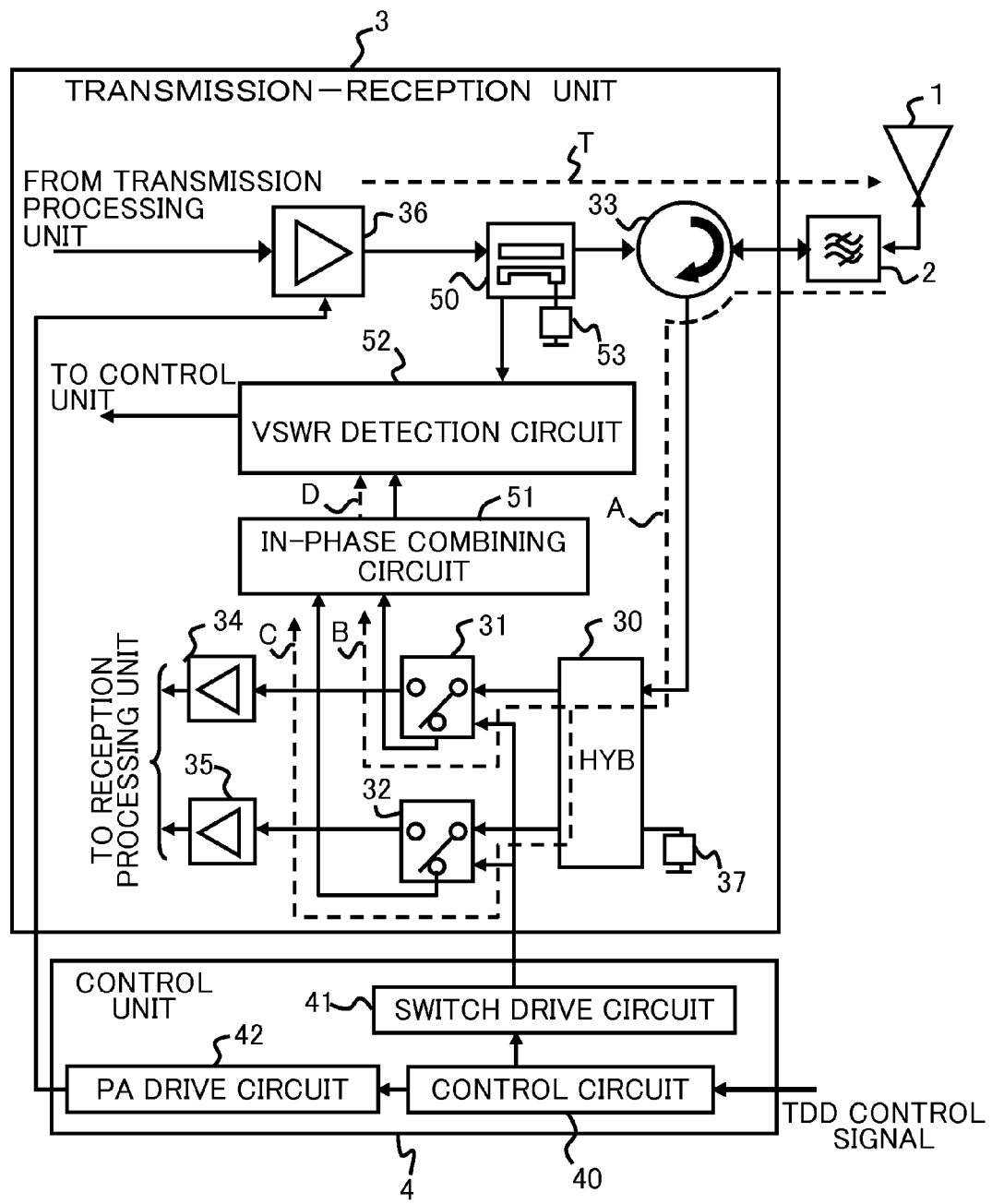
FIG. 4 illustrates a schematic block diagram of a transmitter and receiver according to the third embodiment.

FIG. 4 is a block diagram showing a construction of a transmitter receiver apparatus according to a third embodiment. As shown in FIG. 4, the transmitter-receiver includes a second directional coupler 50, an in-phase combining circuit 51, and a VSWR detection circuit 52, and is operable to detect a voltage standing wave ratio (VSWR), using the output power of the large power amplifier 36 as forward power. The second directional coupler 50 is connected to the output terminal of the large power amplifier 36. The second directional coupler 50 is constituted, for example, by a coupler connected to the terminator 53 of 500Ω, and is operable to take out a part of a transmission signal outputted from the large power amplifier 36.

The in-phase combining circuit 51 is connected to the second output terminal of the first SPDT switch 31 and the fourth output terminal of the second SPDT switch 32. The in-phase combining circuit 51 combines two signals inputted from the first SPDT switch 31 and the second SPDT switch 32 in an in-phase manner, that is, with a phase difference of 0°. The VSWR detection circuit 52 is connected to the second directional coupler 50 and the in-phase combining circuit 51. Since the in-phase combining circuit 51 and the VSWR detection circuit 52 are well known in the art, detailed explanation thereof is omitted. The rest of the construction is the same as that of the first embodiment.

Operations during VSWR detection of the transmitter-receiver are as follows. During a transmission period, a signal taken out by the second directional coupler 50 is supplied to the VSWR detection circuit 52 as forward power. When an impedance of an output portion is reduced due to deterioration or failure of the antenna 1 or a cable, even though a part of a transmission signal (its transmission path is indicated by a broken line T in FIG. 4) that passes through the second directional coupler 50 and that heads for the antenna 1, is reflected, it returns to the transmission-reception unit 3. The signal that has been reflected back passes through the band pass filter 2 and the circulator 33, and enters the first directional coupler 30 (transmission path of this signal is indicated by a broken line A in FIG. 4).

The signal that has been inputted to the first directional coupler 30 is split into two signals with phases mutually different by 90°. The signals that have been split by the first directional coupler 30 pass through the first SPDT switch 31 and second SPDT switch 32, and enter the in-phase combining circuit 51 (transmission paths of these signals are indicated by broken lines B and C in FIG. 4). A signal combined by the in-phase combining circuit 51 is supplied to the VSWR detection circuit 52 as reverse power (transmission path of this signal is indicated by a broken line D in FIG. 4).

The VSWR detection circuit 52 detects a voltage standing wave ratio, on the basis of the forward power fed by the second directional coupler 50 and a reverse power fed by the in-phase combining circuit 51. The detected result is sent to an error processing unit (not shown) or the like in the control unit. Operations regarding transmission and reception are the same as those of the first embodiment.

Figure 5:
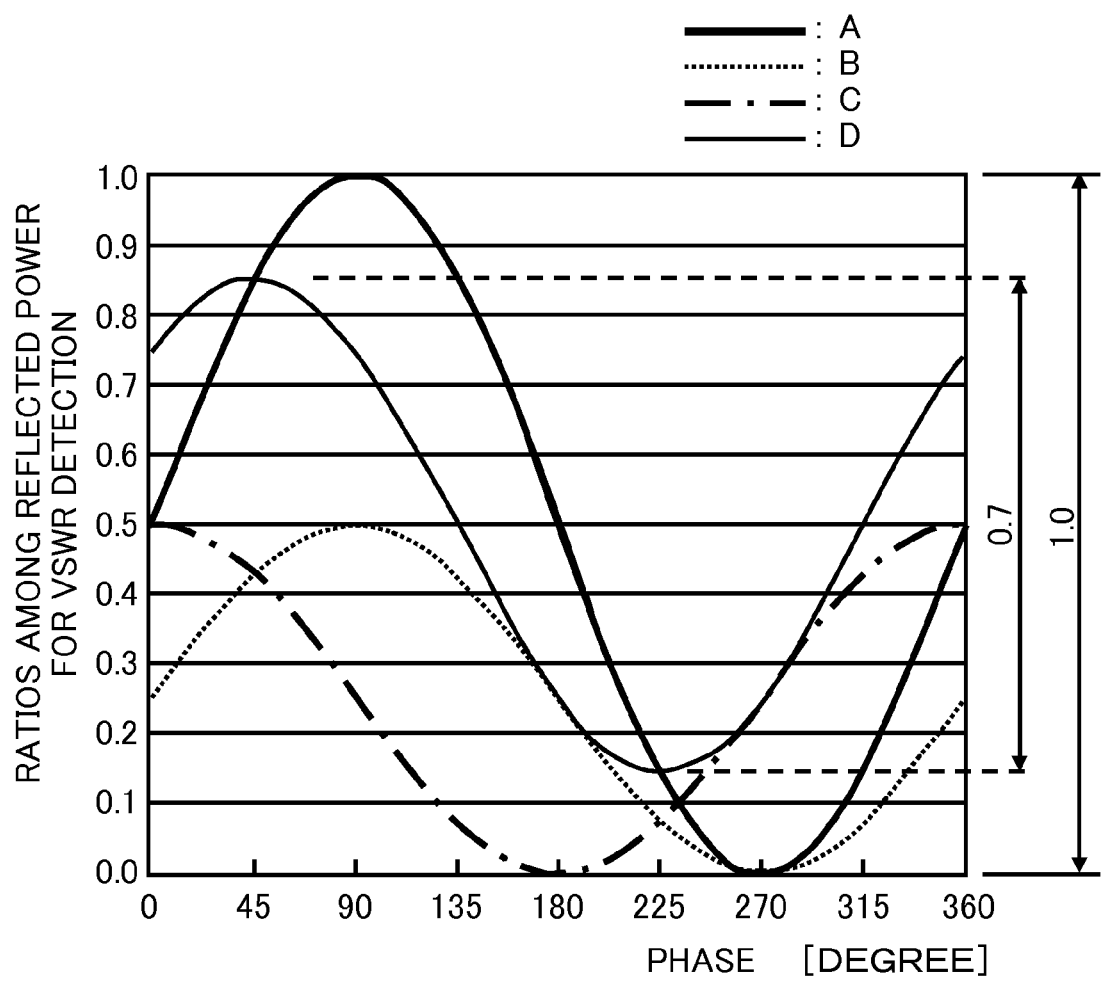
FIG. 5 is a characteristic diagram showing ratios among reflected powers for VSWR.

FIG. 5 is a characteristic diagram showing ratios among reflected powers for VSWR detection. In FIG. 5, characteristic curves A, B, C, and D show reflected powers in transmission lines indicated by broken lines A, B, C and D in FIG. 4. Here, the case where the first directional coupler 30 distributes one half each of power A to powers B and C, is taken as an example.

As shown in FIG. 5, since the phases of the powers B and C are deviated from each other by 90°, the power D that has combined the powers B and C in an in-phase manner is low in variation width as compared with the power A, and specifically, the variation width of the power D is 0.7 times the variation width of the power A. That is, according to the third embodiment, it is possible to reduce the variation in the level of an input to the VSWR detection circuit 52, depending on a position of reflection point (phase), as compared with the case where the power A is inputted directly to the VSWR detection circuit 52 without installing the first directional coupler 30, the first SPDT switch 31, the second SPDT switch 32, and the in-phase combining circuit 51. This results in an enhanced accuracy of VSWR detection function.

Fourth Embodiment

Figure 6:
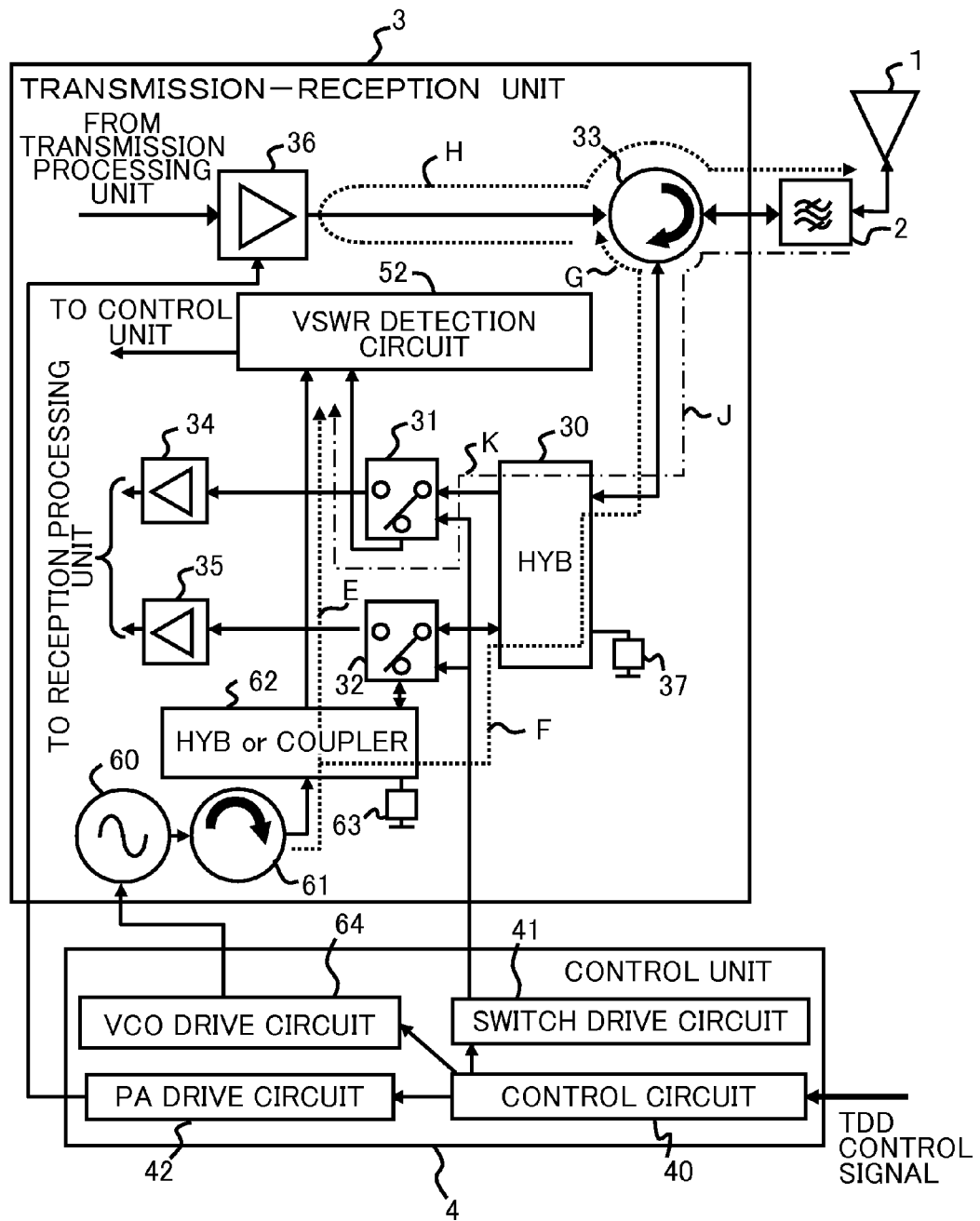
FIG. 6 illustrates a schematic block diagram of a transmitter and receiver according to the fourth embodiment.

FIG. 6 is a block diagram showing a construction of a transmitter receiver apparatus according to a fourth embodiment. As shown in FIG. 6, the transmitter-receiver includes the VSWR detection circuit 52, a false signal generator 60, an isolator 61, a third directional coupler 62, and a VCO drive circuit 64, and is operable to detect the voltage standing wave ratio (VSWR), using power of a false signal as forward power. The false signal generator 60 is constituted, for example, by a voltage controlled oscillator (VCO). The false signal generator 60 is driven by the VCO drive circuit 64 provided in the control unit 4.

When a VCO drive signal inputted from the control circuit 40 is at a Hi level, the VCO drive circuit 64 converts the level of the VCO drive signal into a voltage for operating the false signal generator 60. For example, as in a timing chart shown in FIG. 7, when both of the PA drive signal and the reception switch drive signal are at LO levels, that is, for a non-transmission/reception period during which the transmitter-receiver performs neither transmission nor reception, the VCO drive signal is at a Hi level. When either one of the PA drive signal and the reception switch drive signal are at a Hi level, that is, when the transmitter-receiver is performing transmission or reception, the VCO drive signal is at a lo level.

Figure 7:
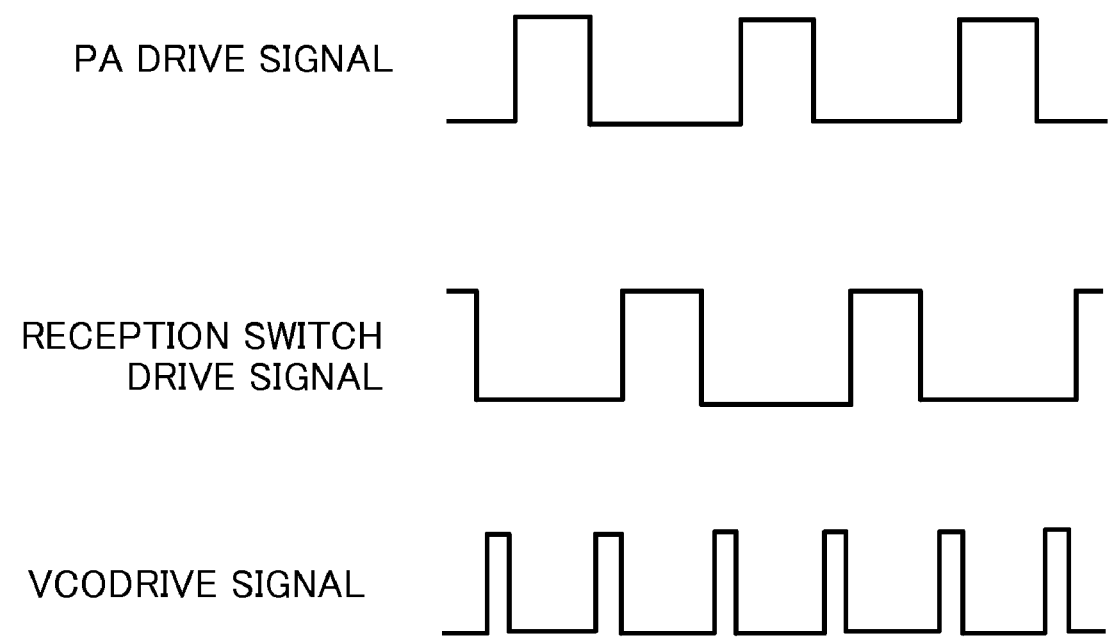
FIG. 7 illustrates an example of a timing chart of operation of the transmitter and receiver illustrated in FIG. 6.

In short, the false signal generator 60 outputs a false signal only when the transmitter-receiver performs neither transmission nor reception. Hence, the transmitter-receiver performs VSWR detection only when the transmitter-receiver performs neither transmission nor reception. In FIG. 7, although the VCO drive signal is at a Hi level for each non-transmission/reception period, the VCO drive signal may be made to be at a Hi level every appropriate number of times, or at appropriate time intervals. The VCO drive circuit 64 controls the oscillation frequency of the false signal generator 60 by controlling the output voltage of itself.

The isolator 61 is connected to an output terminal of the false signal generator 60, as a load stabilizer. The third directional coupler 62 is constituted, for example, by the 90° hybrid coupler (HYB), and is operable to split a signal inputted to a fifth port thereof into two signals having phases different from each other by 90°. The third directional coupler 62 outputs one of the split signals from a sixth port thereof, and outputs the other of the split signals from a seventh port thereof. The fifth port is connected to an output terminal of the isolator 61. The sixth port is connected to the VSWR detection circuit 52. The seventh port is connected to the fourth output terminal of the second SPDT switch 32. An eighth port thereof is connected to a terminator 63 of e.g., 50Ω.

The second output terminal of the first SPDT switch 31 is connected to the VSWR detection circuit 52. The rest of the construction is the same as that of the first embodiment.

Operations during VSWR detection of the transmitter-receiver are as follows. During a non-transmission/reception period, a false signal that has been outputted from the false signal generator 60 and that has passed through the isolator 61 enters the third directional coupler 62, and is split into two signals. A signal outputted from the sixth port of the third directional coupler 62 is supplied to the VSWR detection circuit 52 as forward power (transmission path of this signal is indicated by a dotted line E in FIG. 6). A signal outputted from the seventh port of the third directional coupler 62 passes through the second SPDT switch 32, enters the third port of the first directional coupler 30 (transmission path of this signal is indicated by a dotted line F in FIG. 6), and is outputted from the first port.

The signal outputted from the first port of the first directional coupler 30 passes through the circulator 33 (transmission path of the signal is indicated by a dotted line G in FIG. 6), and after have been reflected in the large power amplifier 36, heads for the antenna 1 (transmission path of the signal is indicated by a broken line H in FIG. 6). When the impedance of the output portion is reduced due to deterioration or failure of the antenna 1 or the cable, even though a part of the signal heading for the antenna 1 is reflected, it returns to the transmission-reception unit 3. The signal that has been reflected back passes through the band pass filter 2 and the circulator 33, and enters the first port of the first directional coupler 30 (transmission path of this signal is indicated by a chain line J in FIG. 6).

The signal that has entered the first directional coupler 30 is outputted from the second port, passes through the first SPDT switch 31, and is supplied to the VSWR detection circuit 52 as reverse power (transmission path of this signal is indicated by a chain line K in FIG. 6). The VSWR detection circuit 52 detects a voltage standing wave ratio, on the basis of the forward power fed by the third directional coupler 62 and the reverse power fed by the first SPDT switch 31. The detected result is sent to the error processing unit (not shown) or the like in the control unit. Operations regarding transmission and reception are the same as those of the first embodiment.

According to the fourth embodiment, since the forward voltage required for VSWR detection is obtained from the false signal, it is unnecessary to provide a coupler or the like between the large power amplifier 36 and the circulator 33 to supply a part of an output voltage of the large power amplifier 36 to the VSWR detection circuit 52 as forward power. Therefore, passage loss in the transmission system can be made lower than that of the third embodiment. Here, the third directional coupler 62 may also be a coupler. Besides, as the oscillation frequency of the false signal generator 60, an out-of-band frequency of the large power amplifier 36 may be used.

Fifth Embodiment

Figure 8:
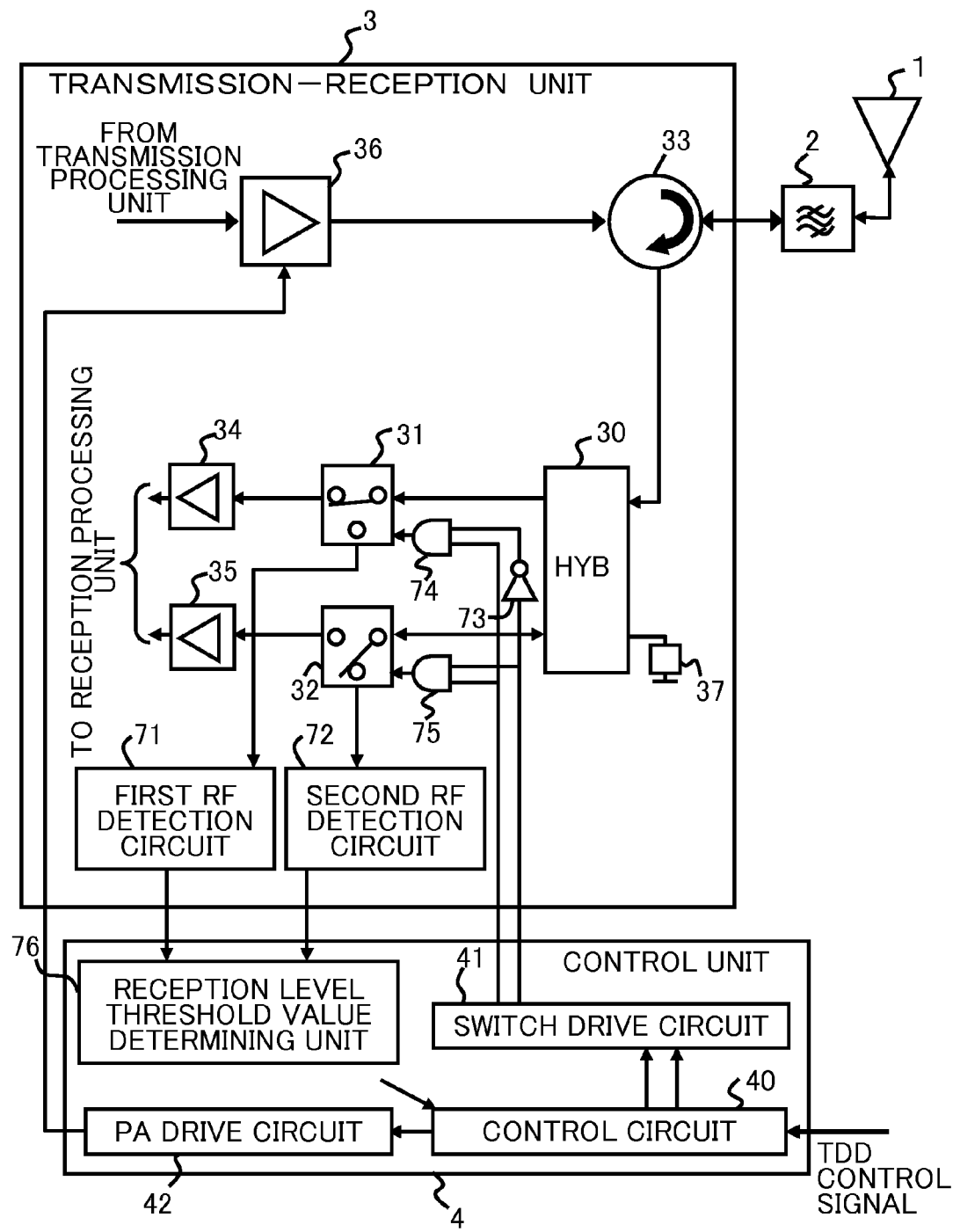
FIG. 8 illustrates a schematic block diagram of a transmitter and receiver according to the fifth embodiment.

FIG. 8 is a block diagram showing a construction of a transmitter receiver apparatus according to a fifth embodiment. As shown in FIG. 8, the transmitter-receiver includes a first RF detection circuit 71 having a function of the first detection circuit, a second RF detection circuit 72 having a function of the second detection circuit, an inverter 73, a first AND circuit 74, a second AND circuit 75, and a reception level threshold value determining unit 76. In response to a reception level, the transmitter-receiver switches between the first low-noise amplifier 34 and the second low-noise amplifier 35 to receive a reception signal. In the fifth embodiment, the first low-noise amplifier 34 and the second low-noise amplifier 35 are different in reception sensitivity (dynamic range) from each other. In the description hereinafter, it is assumed that the second low-noise amplifier 35 has a higher reception sensitivity than the first low-noise amplifier 34.

An input terminal of the first RF detection circuit 71 is connected to the second output terminal of the first SPDT switch 31. The first RF detection circuit 71 detects a signal inputted from the second output terminal of the first SPDT switch 31, and senses its reception level. An input terminal of the second RF detection circuit 72 is connected to the fourth output terminal of the second SPDT switch 32. The second RF detection circuit 72 detects a signal inputted from the fourth output terminal of the second SPDT switch 32, and senses its reception level. Since these RF detection circuits are well known in the art, detailed explanation thereof is omitted.

Figure 9:
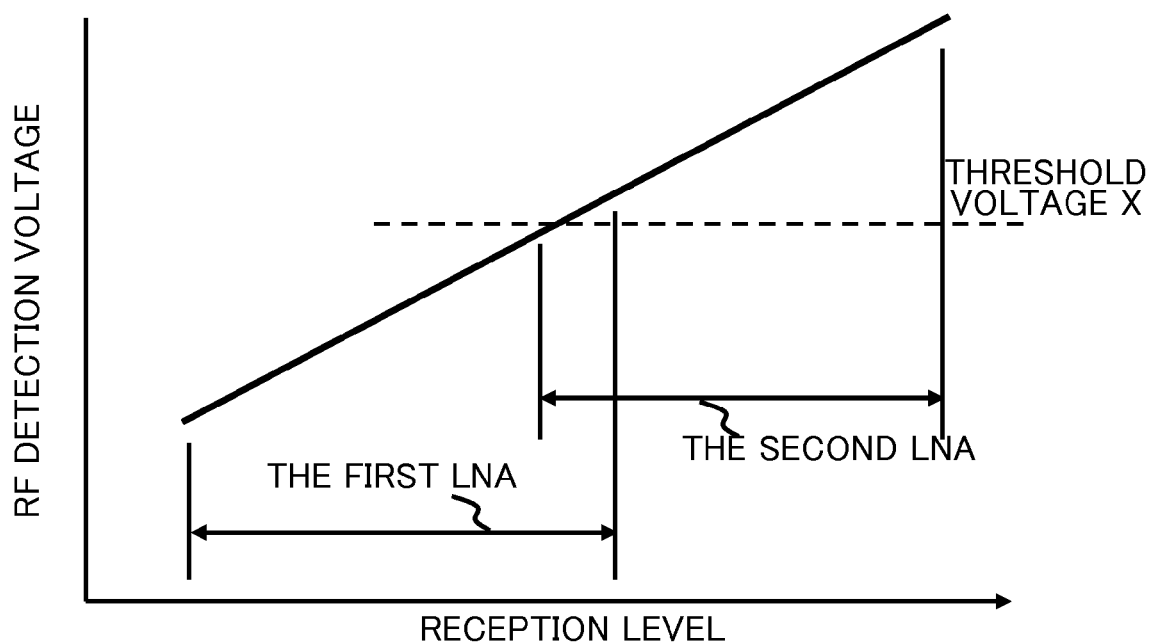
FIG. 9 illustrates a characteristic diagram for explanation of a reception level threshold value determining unit used in the transmitter and receiver of the fifth embodiment illustrated in FIG. 8.

The reception level threshold value determining unit 76 is connected to an output terminal of the first RF detection circuit 71 and an output terminal of the second RF detection circuit 72. As shown in FIG. 9, in the reception level threshold value determining unit 76, a threshold voltage X is set. The reception level threshold value determining unit 76 compares output voltages of the first RF detection circuit 71 and output voltages of the second RF detection circuit 72 with the threshold voltage X, and outputs signals at levels in response to the comparison results to the control circuit 40.

FIG. 10 shows a relationship among output voltages of the first RF detection circuit 71, output voltages of the second RF detection circuit 72, and output voltages of the reception level threshold value determining unit 76. As shown in FIG. 10, in the case where the output voltage from the first RF detection circuit 71 corresponds to no reception, if the output voltage of the second RF detection circuit 72 is not higher than the threshold voltage X, the output voltage of the reception level threshold value determining unit 76 becomes a Lo level (case 1), while if the output voltage of the second RF detection circuit 72 is higher than the threshold voltage X, the output voltage of the reception level threshold value determining unit 76 becomes a Hi level (case 2).

On the other hand, in the case where the output voltage from the second RF detection circuit 72 corresponds to no reception, if the output voltage of the first RF detection circuit 71 is not higher than the threshold voltage X, the output voltage of the reception level threshold value determining unit 76 becomes a Lo level (case 3), while if the output voltage of the first RF detection circuit 71 is higher than the threshold voltage X, the output voltage of the reception level threshold value determining unit 76 becomes a Hi level (case 4). Here, the term "the case where the output voltage from the first RF detection circuit 71 or the output voltage of the second RF detection circuit 72 corresponds to no reception" refers to a state where an input to the first RF detection circuit 71 or the second RF detection circuit 72 is minute because the corresponding second SPDT switches 31 and 32 are connected to the respective low-noise amplifiers 34 and 35. The level of the output voltage of the reception level threshold value determining unit 76 is held, for example, until switching of level is performed.

The control circuit 40 outputs a LAN switching signal in response to the output voltage of the reception level threshold value determining unit 76. In the switch drive circuit 41, this switching signal is converted into a voltage for operating the first SPDT switch 31 and the second SPDT switch 32. This LAN switching signal after having been converted into the voltage is assumed as a reception LAN selection signal.

The inverter 73 inverts a polarity of the reception LAN selection signal outputted from the switch drive circuit 41. Here, a signal that is outputted from the switch drive circuit 41 in the first embodiment and that performs switching control with respect to the first SPDT switch 31 and the second SPDT switch 32, is assumed as a switching changeover signal. The first AND circuit 74 outputs, to the first SPDT switch 31, a logical AND between the inversed signal of the reception LAN selection signal and the switching changeover signal, as a first switching changeover signal. The second AND circuit 75 outputs, to the second SPDT switch 32, a logical AND between the inversed signal of the reception LAN selection signal and the switching changeover signal, as a second switching changeover signal.

The first SPDT switch 31 is switched to the first output terminal side when the first switching changeover signal outputted from the first AND circuit 74 is at a Hi level, while it is switched to the second output terminal side when the first switching changeover signal is at a Lo level. On the other hand, the second SPDT switch 32 is switched to the third output terminal side when the second switching changeover signal outputted from the second AND circuit 75 is at a Hi level, while it is switched to the fourth output terminal side when the second switching changeover signal is at a Lo level. The rest of the construction is the same as that of the first embodiment.

Figure 11:
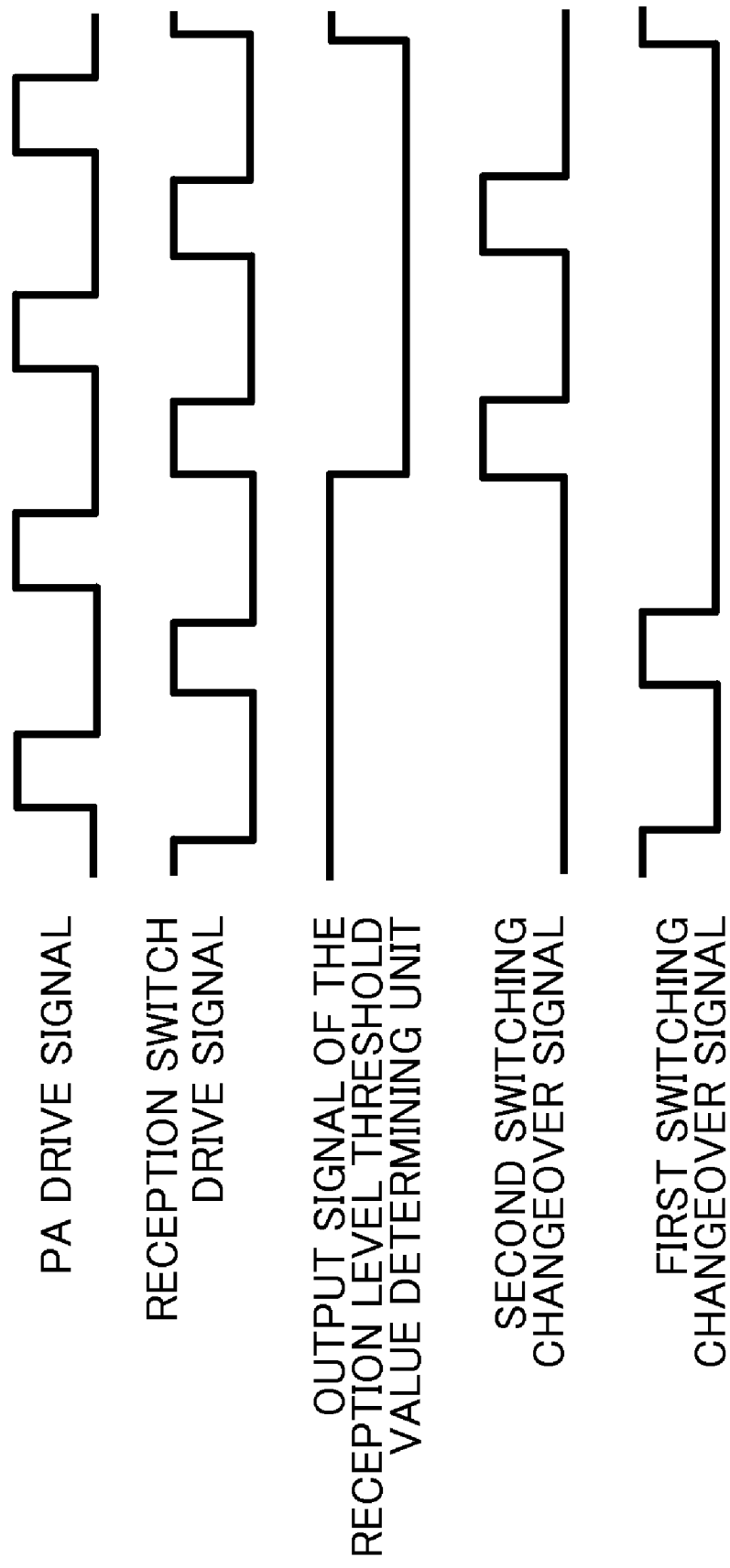
FIG. 11 illustrates an example of a timing chart of operation of the transmitter and receiver according to the fifth embodiment illustrated in FIG. 8.

Operations during a reception of the transmitter-receiver are as follows. FIG. 11 is a timing chart showing operation timing of the transmitter-receiver according to the fifth embodiment. As shown in FIG. 11, for example, it is assumed, during a reception period, that the first SPDT switch 31 has been switched to the side of the first RF detection circuit 71, and that the second SPDT switch 32 has been switched to the side of the second low-noise amplifier 35. In this state, the second low-noise amplifier 35 receives a reception signal, while the first RF detection circuit 71 detects a reception level.

Let an output voltage of the first RF detection circuit 71 be higher than the threshold voltage X (fourth case in FIG. 10). In this case, the output voltage of the reception level threshold value determining unit 76 is at a Hi level. For a reception period during which the reception switch drive signal is at a Hi level, the first switching changeover signal entering the first SPDT switch 31 from the first AND circuit 74 is at a Lo level, while the second switching changeover signal entering the second SPDT switch 32 from the second AND circuit 75 is at a Hi level. Therefore, the second low-noise amplifier 35 receives a reception signal, while the first RF detection circuit 71 detects a reception level.

During a next reception period, an output voltage of the first RF detection circuit 71 is assumed to be not higher than the threshold voltage X (third case in FIG. 10). In this case, the output voltage of the reception level threshold value determining unit 76 is at a Lo level. For a reception period during which the reception switch drive signal is at a Hi level, the first switching changeover signal is at a Hi level while the second switching changeover signal is at a Lo level. As a result, the first SPDT switch 31 is switched to the side of first low-noise amplifier 34, and the second SPDT switch 32 is switched to the side of the second RF detection circuit 72. Therefore, the first low-noise amplifier 34 receives a reception signal, while the second RF detection circuit 72 detects a reception level.

During a next reception period, an output voltage of the second RF detection circuit 72 is assumed to be lower than the threshold voltage X (first case in FIG. 10). In this case, the output voltage of the reception level threshold value determining unit 76 is at a Lo level. For a reception period during which the reception switch drive signal is at a Hi level, the first switching changeover signal is at a Hi level, and the second switching changeover signal is at a Lo level. Therefore, the first low-noise amplifier 34 receives a reception signal, while the second RF detection circuit 72 detects a reception level.

During a next reception period, the output voltage of the second RF detection circuit 72 is assumed to be higher than the threshold voltage X (second case in FIG. 10). In this case, the output voltage of the reception level threshold value determining unit 76 is at a Hi level. For a reception period during which the reception switch drive signal is at a Hi level, the first switching changeover signal is at a Lo level, and the second switching changeover signal is at a Hi level. As a result, the first SPDT switch 31 is switched to the first RF detection circuit 71, and the second SPDT switch 32 is switched to the side of the second low-noise amplifier 35. Therefore, the second low-noise amplifier 35 receives a reception signal, while the first RF detection circuit 71 detects a reception level. The rest of the operations during reception, and operations regarding transmission are the same as those of the first embodiment.

Sixth Embodiment

Figure 12:
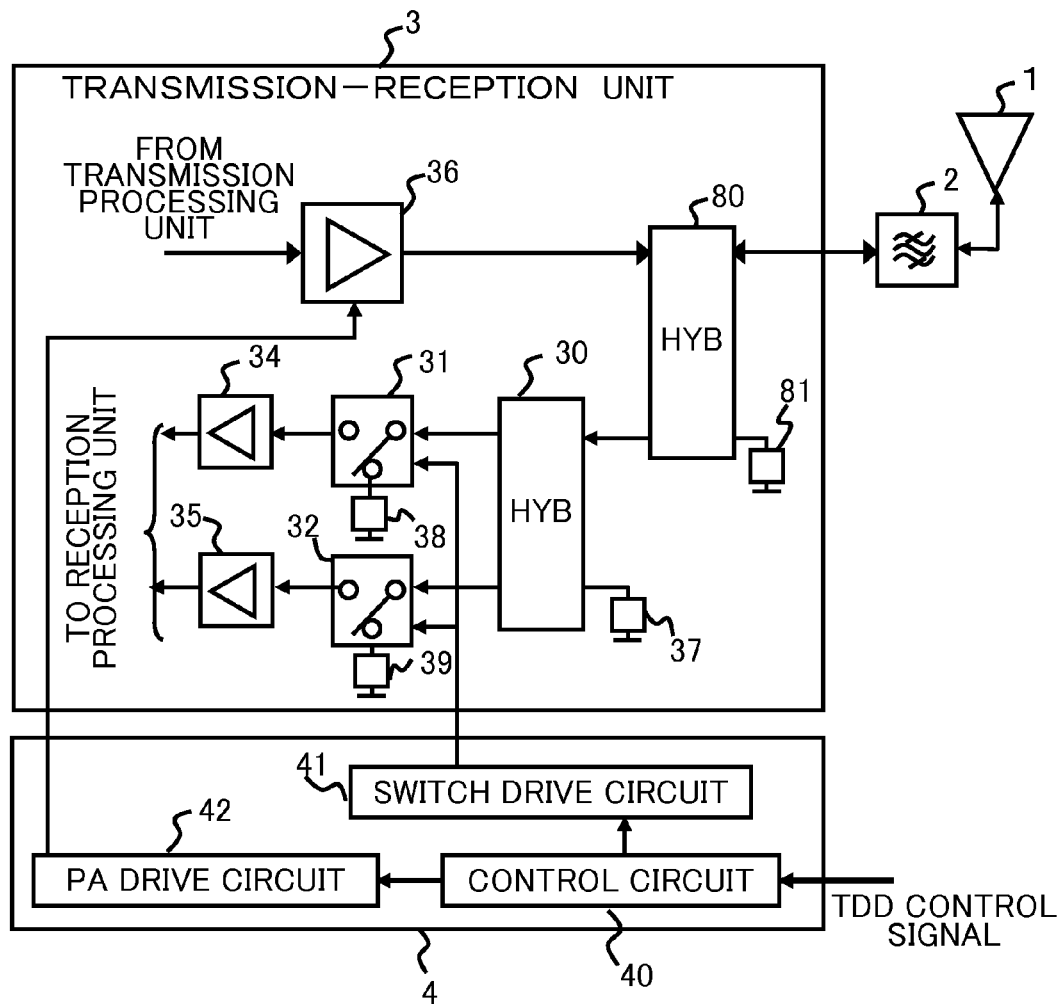
FIG. 12 illustrates a schematic block diagram of a transmitter and receiver according to the sixth embodiment.

FIG. 12 is a block diagram showing a construction of a transmitter receiver apparatus according to a sixth embodiment. As shown in FIG. 12, in place of the circulator, the transmitter-receiver has a fourth directional coupler 80 connected between the large power amplifier 36 and the first directional coupler 30, and the band pass filter 2. The fourth directional coupler 80 is constituted, for example, by a 90° hybrid coupler (HYB). A ninth port thereof is connected to the band pass filter 2. A tenth port thereof is connected to the output terminal of the large power amplifier 36. An eleventh port thereof is connected to the first port of the first directional coupler 30. A twelfth port thereof is for example, connected to a terminator 81 of 50Ω. The rest of the construction is the same as that of the first embodiment.

Because the circulator 33 according to the first embodiment and the fourth directional coupler 80 according to the sixth embodiment are different in characteristic, it is necessary to pay attention to the following points. For example, when the transmitter-receiver is used for a high output device, a passage loss of a transmission system must be reduced. It is, therefore, preferable to use not 3 dB uniform distribution type but use a nonuniform distribution type such as to reduce the passage loss of the transmission system, as the 90° hybrid coupler constituting the fourth directional coupler 80. As compared with the case of usage of the circulator, the use of the 90° hybrid coupler increases power that returns to the large power amplifier 36 when reflection of transmission power occurs on the side of the antenna 1. Accordingly, when the 90° hybrid coupler is used in place of the circulator, it is preferable to use it in a device of which the antenna 1 is supposed to be free from failure, or use it under the conditions so as not to cause a failure to the large power amplifier 36. Also, in each of the above-described second to fifth embodiments, the fourth directional coupler 80 can be employed in place of the circulator, as well.

As described above, according to each of the embodiments, since the load as viewed from the reception side during transmission is always 50Ω, it is possible to operate the large power amplifier 36 in a satisfactory state. Furthermore, since each of the first SPDT switch 31 and the second SPDT switch 32 can be constituted by a compact element, cost reduction can be achieved. Moreover, as compared with case where a large-sized TDD switches are arranged between the transmission side and the reception side, and the antenna 1, it is possible to construct a system with a circuit configuration that is compact and inexpensive. In this case, due to unnecessity of the large-sized TDD switched, transmission power can be reduced.

This allows a compact amplifier to be used as the large power amplifier 36. This leads to a reduction in power consumption, thereby allowing downsizing of a radiating fin.

As compared with the case where the circulator is provided between the transmission side and the reception side, and the antenna 1, and where the large isolator is provided between this circulator and the reception side, the transmitter-receiver according to each of the embodiments can build a system with a compact circuit configuration. Furthermore, since there is no need to have a high ability of the first SPDT switch 31 and the second SPDT switch 32, to block sneaking of transmission power, a device resistance on the reception side can be reduced, resulting in a reduced cost. Thus, the transmitter-receiver according to each of the embodiments is suitable for time-division type transmitter-receivers in mobile radio communication devices that transmit/receive electromagnetic waves in a microwave band or millimeter wave bands, or radar devices that transmit/receive electromagnetic waves in a microwave band or millimeter wave band.

What is claimed is:

1. A transmitter and receiver apparatus operable to transmit signals from a common antenna during a transmitting period and to receive signals through the common antenna during a receiving period in a time divisional manner, the transmitter and receiver apparatus comprising:

a first directional coupler having a first, a second, a third, and a fourth port, the first port for receiving a signal, the second port for outputting a first signal, the third port for outputting a second signal, the first and the second signals being of phase difference by 90 degrees to each other, and the fourth port being terminated in a predetermined impedance;

a first switch including a first input terminal coupled to the second port for receiving the first signal, a first output terminal, and a second output terminal, for switching between a first state during a passage mode in which the first input terminal is coupled to the first output terminal and a second state during a block mode in which the first input terminal is coupled to the second output terminal; and a second switch including a second input terminal coupled to the third port for receiving the second signal, a third output terminal, and a fourth output terminal, for switching between a third state during the passage mode in which the second input terminal is coupled to the third output terminal and a fourth state during the block mode in which the second input terminal is coupled to the fourth output terminal.

2. The transmitter receiver apparatus according to claim 1, further comprising:

a first reception amplifier for amplifying a signal outputted from the first output terminal; and a second reception amplifier for amplifying a signal outputted from the third output terminal.

3. The transmitter receiver apparatus according to claim 2, further comprising:
   a transmission amplifier; and
   a reception and transmission switching circuit for sending a signal outputted from the transmission amplifier to the common antenna and sending a signal sent from the common antenna to the first port.

4. The transmitter receiver apparatus according to claim 3, further comprising a control circuit for controlling the first switch and the second switch so as to be set in the block mode during the transmitting period and in the passage mode during the receiving period.

5. The transmitter receiver apparatus according to claim 3, wherein the second output terminal of the first switch and the fourth output terminal of the second switch are terminated with individual predetermined impedances.

6. The transmitter receiver apparatus according to claim 3, wherein the second output terminal of the first switch and the fourth output terminal of the second switch are individually open ended.

7. The transmitter receiver apparatus according to claim 4, further comprising:
   a second directional coupler for taking out a part of the signal outputted from the transmission amplifier;
   a circuit for combining a signal outputted from the second output terminal and a signal outputted from the fourth output terminal during the block mode; and
   a detecting circuit for detecting a voltage standing wave ratio on the basis of a power of a signal outputted from the second directional coupler and a power of a signal outputted from the circuit.

8. The transmitter receiver apparatus according to claim 4, further comprising:
   a false signal generator for generating a false signal;
   a third directional coupler having a fifth port, a sixth port, and a seventh port, for receiving the false signal at the fifth port and outputting the false signals from the sixth port and the seventh port;
   a detecting circuit for detecting a voltage standing wave ration on the basis of a power of two signals, one of the signals being outputted from the sixth port and the other of the signals being successively outputted from the seventh port, fed through the second switch and the first directional coupler, reflected from between the first directional coupler and the common antenna, fed through the first directional coupler and the first switch, and outputted from the first switch; and
   a control circuit for controlling the false signal generator so as to generate the false signal during a period between the transmitting period and the receiving period, and controlling the first switch and the second switch so as to be set in the blocking mode.

9. The transmitter receiver apparatus according to claim 3, further comprising:
   a first detection circuit for detecting a first amount of a signal outputted from the second output terminal of the first switch;
   a second detection circuit for detecting a second amount of a signal outputted from the fourth output terminal of the second switch;
   a switching control circuit for controlling the first switch and the second switch so as to turn to the block mode during the transmitting period, and controlling during the receiving period one of the first switch and the second switch so as to turn to the passage mode and the other of the first switch and the second switch so as to turn to the block mode on the basis of one of the first amount and the second amount.

10. The transmitter receiver apparatus according to claim 3, further comprising a control circuit for controlling a power source of the transmission amplifier so that the transmission amplifier is turned on during transmitting the signals through the common antenna and is turned off during receiving the signals through the common antenna.

* * * * *